United States Patent [19]
Lanyon

[11] Patent Number: 5,367,889
[45] Date of Patent: Nov. 29, 1994

[54] EXHAUST TREATMENT APPARATUS

[76] Inventor: Joseph G. Lanyon, 15607 Hwy. 47, Yamhill, Oreg. 97148

[21] Appl. No.: 112,752

[22] Filed: Aug. 25, 1993

[51] Int. Cl.$^5$ .............................................. F01N 3/02
[52] U.S. Cl. ..................................... 60/297; 60/311
[58] Field of Search ................. 60/297, 272, 273, 274, 60/311; 55/DIG. 30

[56] References Cited

U.S. PATENT DOCUMENTS

| | | | |
|---|---|---|---|
| 1,891,170 | 12/1932 | Nose | 60/297 |
| 2,742,885 | 4/1956 | Thwaites et al. | |
| 2,998,308 | 8/1961 | Ruth | 60/297 |
| 3,340,859 | 9/1967 | Williamson | |
| 3,642,259 | 2/1972 | Bowden | 60/297 |
| 3,647,394 | 3/1972 | Wetch | 60/297 |
| 3,729,900 | 5/1973 | Denning | 60/297 |
| 3,816,594 | 6/1974 | Kobylinki et al. | |
| 3,849,538 | 11/1974 | Campbell et al. | |
| 3,853,484 | 12/1974 | Sudar | 60/297 |
| 3,962,864 | 6/1976 | Williams et al. | |
| 3,978,193 | 8/1976 | Fedor et al. | |
| 4,047,895 | 9/1977 | Urban | 60/297 |
| 4,074,975 | 2/1978 | Tokura | 60/297 |
| 4,188,364 | 2/1980 | Gladden | |
| 4,190,629 | 2/1980 | Strachan | 60/297 |
| 4,778,665 | 10/1988 | Krishnamurthy et al. | |
| 4,853,007 | 8/1989 | Leonhard et al. | |
| 4,949,539 | 8/1990 | Hsu | 55/DIG. 30 |
| 5,002,741 | 3/1991 | Hooper | |
| 5,021,227 | 6/1991 | Kobayashi et al. | |
| 5,035,115 | 7/1991 | Ptasinski | |

Primary Examiner—Ira S. Lazarus
Assistant Examiner—Daniel J. O'Connor
Attorney, Agent, or Firm—Sheldon & Mak

[57] ABSTRACT

Disclosed is an apparatus for scrubbing combustion gas, the gas being directed downwardly through a first scrubber passage having a first nozzle for feeding a scrubbing liquid that contacts the gas, a first filter material being held within the first scrubber passage and below the first nozzle, the gas being directed upwardly through a second scrubber passage optionally having a second nozzle for feeding additional scrubbing liquid that contacts the gas, and a cartridge for holding at least one second filter material within the second scrubber passage. The cartridge includes a first supply of limestone at least partially submerged in the scrubbing liquid, a supply of the borax above the first supply of the limestone, and a second supply of the limestone above the supply of borax. A reservoir chamber connects bottom extremities of the scrubber passages, the chamber being capable of sealingly retaining a supply of the scrubbing liquid to a sufficient level that gas flowing into the second scrubber passage from the first scrubber passage is required to pass through the scrubbing liquid. A third filter material including charcoal can be provided in the second scrubber passage and above the optional second nozzle, the gas being required to flow through the third filter material. A pump feeds the scrubbing liquid from the reservoir chamber to the first and second nozzles. An ignitor produces secondary combustion of upwardly flowing exhaust gas in an inlet passage.

18 Claims, 1 Drawing Sheet

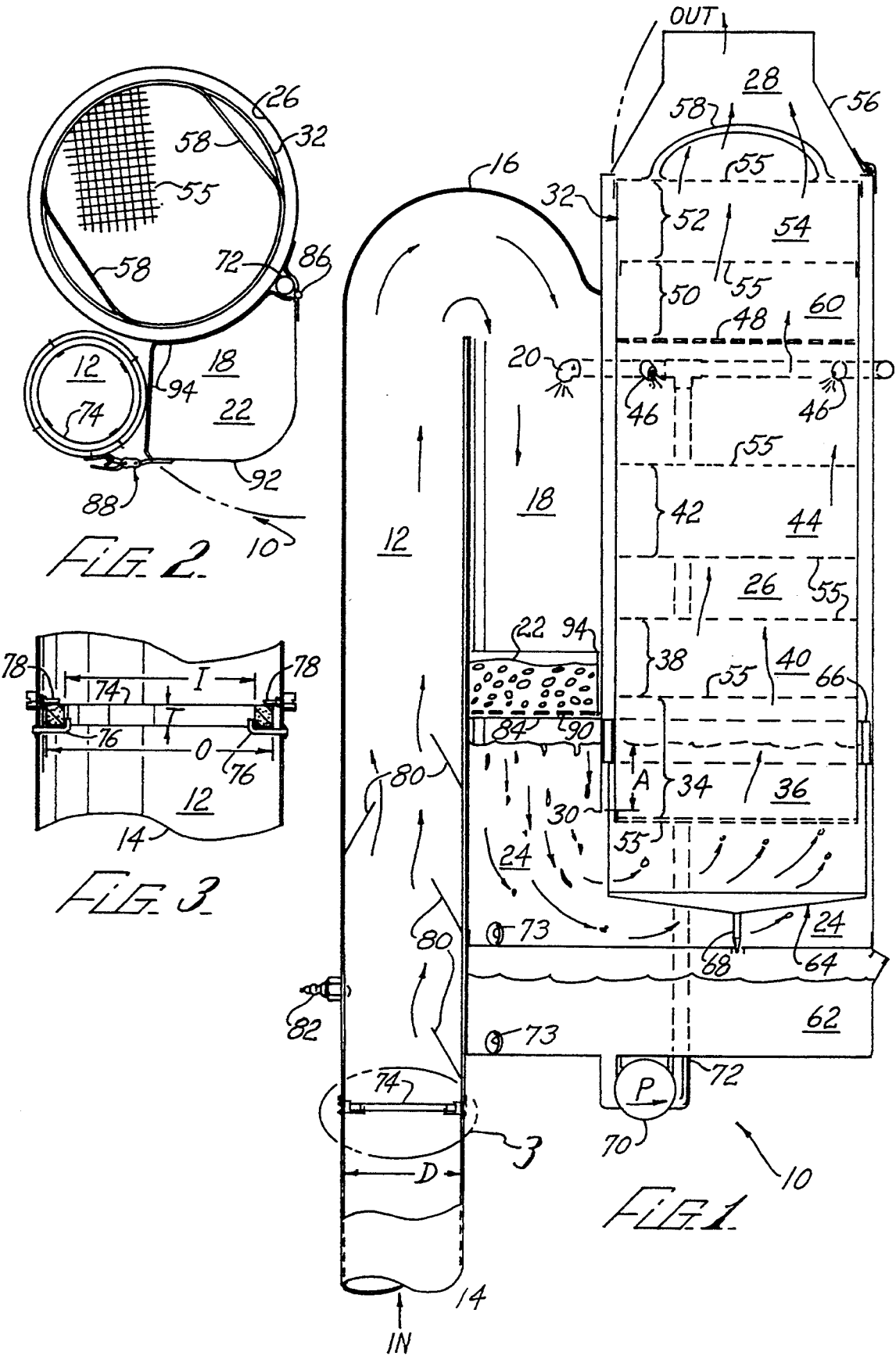

EXHAUST TREATMENT APPARATUS

BACKGROUND

The present invention relates to combustion exhaust pollution control, and more particularly to pollution control for heavy vehicles such as trucks and buses.

In the past, exhaust pollution controls for Diesel as well as gasoline trucks and buses have been less stringently regulated than for automobiles. Thus while great strides have been made for cleaning up exhaust emissions of automobiles, trucks, buses, and many stationary power plants remain as heavy sources of pollution.

U.S. Pat. No. 3,340,859 to Williamson discloses an internal combustion engine whose exhaust is fed through a scrubber tank having a baffle and liquid in the tank extending to above the bottom of the baffle, at least a portion of the scrubbed exhaust gases being returned to an intake manifold of the engine. U.S. Pat. No. 3,962,864 to Albert et al. discloses an exhaust gas cooler and scrubber for a gas turbine engine, the hot exhaust gas flowing through a bed of flints that also receives a supply of water which carries calcium carbonate and manganese sulfate for recovering sulphur in the form of calcium sulfate from the exhaust gas. U.S. Pat. No. 5,035,115 to Ptasinski discloses an Otto cycle Diesel engine having superheated water injection for steam operation, heating of the water being done in a series of counterflow heat exchangers. During fossil fuel operation, exhaust gases flow through a water reservoir for washing out smoke particulates, and a catalytic converter for filtering and reducing oxides of nitrogen.

Typical prior art exhaust gas treatment, especially for trucks, buses and large stationary power plants, nevertheless suffers from one or more of the following disadvantages:

1. They are ineffective in removing a desired proportion of pollutants;
2. They degrade engine performance; and
3. They are expensive to produce and maintain in that they consume expensive materials such as platinum and tungsten that are typically inaccessibly located within welded enclosures.

Thus there is a need for an apparatus for removing pollution from exhaust gases of large internal combustion power plants that avoids the disadvantages of the prior art.

SUMMARY

The present invention meets this need by providing an exhaust gas scrubber apparatus that uses low-cost cartridge filter components. In one aspect of the invention, the apparatus includes means for directing the gas downwardly through a first scrubber passage, the first scrubber passage having first nozzle means for feeding a scrubbing liquid, the liquid contacting the gas, and means for holding a first filter material within the first scrubber passage and below the first nozzle means; means for directing the gas upwardly through a second scrubber passage, the second scrubber passage having second nozzle means for feeding the scrubbing liquid, the liquid contacting the gas, and cartridge means for holding at least one second filter material within the second scrubber passage and below the second nozzle means; and a reservoir chamber connecting bottom extremities of the scrubber passages, the reservoir chamber being capable of sealingly retaining a supply of the scrubbing liquid to a sufficient level that gas flowing into the second scrubber passage from the first scrubber passage is required to pass through the scrubbing liquid.

The second filter material can include limestone. When the gas is produced by combustion in a Diesel cycle, the second filter material can include borax. The second filter material can include limestone in combination with borax. The cartridge means can include means for holding a first supply of the limestone at least partially submerged in the scrubbing liquid, and means for holding a supply of the borax above the first supply of the limestone. The cartridge means can further include means for holding a second supply of the limestone above the supply of borax. The cartridge means can further include means for holding a supply of particulate charcoal above the supply of borax. The cartridge means can further include means for holding a supply of activated particulate charcoal above the supply of borax, the charcoal having been activated by oxidation of heavy metal components thereof.

When the gas is produced by combustion of gasoline, at least one of the first filter material and the second filter material preferably includes crystalline ammonia. The second filter material can include limestone in combination with the ammonia.

The apparatus can further include means for holding at least one third filter material in the second scrubber passage and above the second nozzle means, the gas being required to flow through the third filter material. The third filter material can include activated charcoal. The apparatus can further include baffle means between the second nozzle means and the third filter material for preventing upward flow of the liquid.

The apparatus can include pump means for feeding the scrubbing liquid from the reservoir chamber to the first and second nozzle means. The apparatus can further include means for directing the gas upwardly through an inlet passage, an outlet of the inlet passage being fluid-connected to an inlet of the first scrubber passage. The apparatus can include ignition means for producing secondary combustion of the gas in the inlet passage. Baffle means can be provided in the inlet passage for promoting the secondary combustion. The gas can be produced by combustion of gasoline, the apparatus further including a ceramic member, the ceramic member being heated sufficiently by the gas for promoting the secondary combustion. The gas can be produced by combustion of Diesel fuel, the first filter material including copper ore.

DRAWINGS

These and other features, aspects, and advantages of the present invention will become better understood with reference to the following description, appended claims, and accompanying drawings, where:

FIG. 1 is an expanded elevational sectional view of an exhaust gas treatment apparatus according to the present invention;

FIG. 2 is a plan sectional view of the apparatus of FIG. 1; and

FIG. 3 is a sectional elevational detail view of a portion of the apparatus of FIG. 1.

DESCRIPTION

The present invention is directed to an exhaust gas treatment apparatus that is particularly effective for large internal combustion power plants. With reference to FIGS. 1-3 of the drawings, a treatment apparatus 10 according to the present invention includes an inlet or first passage 12 having an inlet 14 at one end thereof, the first passage 12 being fluid connected by a coupling 16 to a second passage 18 wherein exhaust gas flow is downwardly directed past first nozzle means 20 and subsequently first filter means 22, the first filter means 22 being positioned above a scrubber tank 24 at the bottom of the second passage 18. The second passage 18 thus functions as a scrubber passage of the treatment apparatus 10. In a first configuration, for treating Diesel exhaust gases, an exemplary and preferred material for the first filter means 22 is a supply of copper ore.

The scrubber tank 24 extends from beneath the second passage 18 to an adjacent third passage 26, the exhaust gas being directed upwardly through the third passage 26 to an outlet 28 of the treatment apparatus 10. As further described herein, a suitable fluid such as water is maintained in the scrubber tank 24 at a level A above a bottom extremity 30 of the second passage 18 for directing all exhaust gases received by the apparatus 10 to pass through the fluid. As described further below, a portion of the fluid is also supplied to the first nozzle means 20 for directing a spray of the fluid onto the first filter means 22, the fluid also contacting the gas, at least a portion of the fluid eventually falling into the scrubber tank 24.

In further accordance with the present invention, a filter cartridge 32 is removably supported in the third passage 26, the filter cartridge 32 extending from proximate the bottom extremity 30 of the second passage 18 to proximate the outlet 28. More particularly, the filter cartridge 32 includes a first cavity 34 for supporting a second filter means 36 at least partially submerged in the fluid. In exemplary configuration of the apparatus 10, the second filter means 36 includes a supply of limestone for removing soot from the exhaust gases. A second cavity 38 of the cartridge 32, located above the first cavity 34, supports third filter means 40. In the first configuration of the apparatus 10 (Diesel), the third filter means 40 preferably includes a supply of borax.

The cartridge 32 also provides a third cavity 42, the third cavity 42 being spaced above the second cavity 38 for supporting fourth filter means 44, the fourth filter means 44 being a further supply of limestone. A plurality of second nozzle means 46 is supported within the third passage 26 for directing a spray of the fluid onto the fourth filter means 44. The fluid also wets the third filter means and portions of the second filter means that would otherwise be dry, the third passage also providing a scrubber passage of the apparatus 10. In the first configuration of the apparatus 10 (Diesel), the fourth filter means 40 can include a supply of charcoal as a preferred alternative to the limestone.

The cartridge 32 further includes a baffle plate 48 that is horizontally located above the second nozzle means 46 for preventing excess fluid from being carried to the outlet 28, a fourth cavity 50 extending above the baffle plate 48. The cartridge 32 further includes a fifth cavity 52 above the fourth cavity 50 for supporting fifth filter means 54, the fifth filter means 54 being a supply of charcoal for removing unburned hydrocarbons. Upper and lower extremities of each of the cavities of the cartridge member 32 are defined by respective perforate members 55, the perforate members 55 being screens, perforate plates or the like for freely passing the exhaust gases while confining the respective filter means within the corresponding cavities. In the first configuration of the apparatus 10 (Diesel), the fifth filter means 54 is preferably a supply of activated charcoal for avoiding the introduction of heavy metals to the exhaust gases. For this purpose, the charcoal can be treated in a microwave oven for burning heavy metals contained therein. A suitable treatment is baking half-pound batches of the charcoal for 10 minutes at maximum power in a conventional microwave oven.

The outlet 28 is formed in an openable cover 56 for the third passage 26, handle means 58 for lifting the cartridge 32 from the third passage 26 extending within the cover 56 in its closed position. Optionally, sixth filter means 60 is supportable within the fourth cavity 50, the sixth filter means 60 being a supply of copper-coated zeolite for absorbing oxides of nitrogen.

A reservoir 62 is fluid-connected to the scrubber tank 24 by a float valve means 64, the float valve means 64 including a float member 66 that surrounds the cartridge 32, and a valve plunger 68 that variably blocks fluid flow from the tank 24 to the reservoir 62 in response to vertical movement of the float member 66. Pump means 70 is fluid-connected to the reservoir 62 for feeding the first and second nozzle means 20 and 46 via a standpipe 72. Accordingly, the fluid is continuously maintained at proximately the level A by the fluid being fed from the nozzle means 20 and 46, the fluid being controllably returned to the reservoir 62 by the float valve means 64. Openable cleanout openings 73 are provided at bottom extremities of the tank 24 and the reservoir 62 for removing collected soot and particulates from the apparatus 10. The nozzle means 22 and 46 preferably each include valve means for feeding the fluid from selected locations within the apparatus 10, suitable nozzle/valve units being commercially available from a variety of sources.

Preferably, and as further shown in the drawings, the first passage 12 is equipped for promoting secondary combustion of the incoming exhaust gases as described herein. In particular, a ceramic ring member 74 is supported in spaced relation within the first passage 12 on a plurality of L-shaped members 76 that radially extend within the first passage 12. The ring member 74 is also retained on the L-shaped members 76 by a plurality of removable prong members 78 that radially extend over at least a portion of the ring member 74. Typically, the first passage 12 is cylindrically circular, having an inside diameter D, the ring member 74 having an outside diameter O, an inside diameter I and a thickness T. A preferred inside diameter D of the first passage 12 that is suitable for many heavy truck applications, for example, is 5.0 inches. Corresponding preferred dimensions for the ring member 74 are O=4.75 inches, I=4.0 inches, and T=0.75 inch.

A spaced plurality of baffle members 80 are fixably supported within the first passage 12 above the ring member 74 for imparting a desired degree of turbulence to the exhaust gases. Also, a glow plug 82 is fixably mounted proximate the ring member 74, the glow plug 82, in combination with the ring member 74 and the baffle members 80, inducing and promoting the secondary combustion of the exhaust gases, thereby reducing the concentration of soot and unburned hydrocarbons to be removed in the second and third passages 18 and 26.

As best shown in FIG. 2, the first filter means 22 is supported on a tray member 84 that is movably connected to the second passage 18 between a closed position and an opened position for servicing the first filter means 22. More particularly, one extremity of the tray member 84 is connected to the apparatus 10 by a tray hinge 86, an opposite extremity having a latch assembly 88 for releasably holding the tray member 84 in the closed position. The tray member 84 is formed with a porous bottom portion 90 and wall portions, an exterior wall portion 92 sealingly closing the second passage 18 in the closed position of the tray member 84, and an inside wall portion 94, the wall portions 92 and 94 also confining the first filter means 22 when the tray member 84 is opened.

In a second configuration of the treatment apparatus 10 for use with gasoline engines, the first filter means 22 and the third filter means 40 include ammonia crystals for absorbing oxides of nitrogen.

An experimental prototype of the apparatus 10 in the first configuration (Diesel) has been built according to the present invention and tested at a commercial laboratory for measuring $NO_x$, $SO_x$, CO, $CO_8$, and oxygen concentrations at the inlet 14 and outlet 28 of the apparatus 10 as installed on a diesel powered tractor unit. The experimental prototype was loaded with the first filter means 22 being one-inch borax fragments, the second filter means being limestone fragments ranging from approximately ¼-inch to ¾-inch below the level A of the fluid and approximately ¾-inch above the fluid. The third filter means was ¾-inch borax rock, the fourth filter means 44 was approximately two pounds of charcoal in 1/16-inch fragments, and the fifth filter means 54 was a like complement of activated charcoal as described above, the fourth filter means 44 being spaced approximately 2 inches below the fifth filter means. The fluid was a water solution of borax, approximately 4 ounces per gallon, the fluid being fed at approximately 10 lb. per min. through a single nozzle of the first nozzle means 20 only.

The apparatus 10 was tested at three engine speeds of the tractor unit, 600, 1000, and 1500 RPM without an applied load. Each test was conducted for a minimum of 15 minutes, with gas from the outlet 28 being monitored, the apparatus 10 being then removed and corresponding results obtained at the inlet 14. The flow rate at the inlet 14 was measured by interposing an 8-foot length of 8-inch diameter ducting, in combination with a Pitot tube and differential pressure gauge. The average temperature was measured using SCAQMD Method 2.1 and the matrix of transverse points was determined using SCAQMD 1.1. The inlet and exhaust flue gas moisture content using combustion approximation methodology according to SCAQMD Method 4.1.

Emittent concentrations were determined using continuous emissions monitoring (CEM) according to SCAQMD Method 100.1, using a stainless-steel probe connected by Teflon ® tubing to a condenser bath at 0° C., the condenser being connected by an in-line glass fiber filter and more Teflon tubing to instrumental analyzers of a monitoring system for minimal contact between sample gas and the condensate and particulate matter. Calibration by standard gases before and after testing was within 2% using USEPA Protocol 1. Overall zero and span drift errors did not exceed 2%, as recorded by introducing $NO_x$ and $SO_x$ gases before and after each test run. The entire system was leak checked at 20 inches of vacuum with negative results before and after each test run. The results, which were obtained on Sep. 9, 1992, are presented in the following Tables.

TABLE 1

| Test Set #1 - Outlet 28 (Scrubber Exhaust) | | | |
|---|---|---|---|
| Test Summary | Low Speed (600 RPM) | Average Speed (1000 RPM) | High Speed (1500 RPM) |
| Elapsed Time (minutes) | 23 | 32 | 12 |
| Concentrations | | | |
| Carbon Monoxide (CO), ppmv | 174 | 183 | 264 |
| Oxygen ($O_2$), % | 18.9 | 18.5 | 18.0 |
| Carbon Dioxide ($CO_2$), % | 1.6 | 1.7 | 2.1 |
| Oxides of Nitrogen ($NO_x$), ppmv | 45.0 | 61.5 | 69.9 |
| Emission Rate lbs/hr as $NO_2$ | 0.030 | 0.076 | 0.093 |
| Oxides of Sulfur ($SO_x$), ppmv | 0.0 | 1.0 | 3.0 |
| Emission Rate lbs/hr as $SO_2$ | 0.000 | 0.002 | 0.006 |

TABLE 2

| Test Set #2 - Inlet 14 (Without Scrubber) | | | |
|---|---|---|---|
| Test Summary | Low Speed (600 RPM) | Average Speed (1000 RPM) | High Speed (1500 RPM) |
| Elapsed Time (minutes) | 19 | 23 | 14 |
| Concentrations | | | |
| Carbon Monoxide (CO), ppmv | 106 | 26 | 168 |
| Oxygen ($O_2$), % | 15.3 | 2.5 | 18.8 |
| Carbon Dioxide ($CO_2$), % | 0.7 | 0.6 | 1.6 |
| Oxides of Nitrogen ($NO_x$), ppmv | 23.9 | 0.6 | 49.5 |
| Emission Rate lbs/hr as $NO_2$ | 0.055 | 0.003 | 0.274 |
| Oxides of Sulfur ($SO_x$), ppmv | 40.0 | 28.0 | 3.0 |
| Emission Rate lbs/hr as $SO_2$ | 0.128 | 0.170 | 0.023 |

From the results, the scrubber 10 of the present invention reduced the concentrations of $NO_x$ by 23.9−45.0=−21.1 (−88.3%), 0.6−61.5=−60.9 (−10,150%), and 49.5−69.9=−20.4 (−41.2%) at the low, medium and high speeds, the emission rates being correspondingly reduced by 0.055−0.030=0.025 (45.5%), 0.076−0.003=0.073 (96.1%), and 0.274−0.093=0.181 (66.8%). The concentrations of $SO_x$ were reduced by 40.0−0.0=40.0 100%, 28.0−1.0=27.0 96.8%, and 3.0−3.0=0 (0.0%) at the low, medium and high speeds, the emission rates being correspondingly reduced by 0.128−0.000=0.128 (100%), 0.170−0.002=0.168 (98.8%), and 0.023−0.006=0.017 (74%).

The above results were subject to further scrutiny in view of the wide variations of the $NO_x$ readings, and in particular the increase in concentration levels with the apparatus 10 operational. It was determined that the test apparatus, which was very sensitive, became clogged with soot, so that the measured concentrations became falsely attenuated, particularly in the later stages of the testing when the apparatus 10 was removed from the tractor. Further tests were then performed on Sep. 24 and 25, 1992, using less sensitive test instruments, and under less-stringent controls, the results being presented below in Tables 3 and 4.

TABLE 3

| Further Tests - Outlet 28 (With Scrubber) | | | |
|---|---|---|---|
| Test Summary | Low Speed (625 RPM) | Average Speed (1000 RPM) | High Speed (1500 RPM) |
| Elapsed Time (minutes) | 20 | 20 | 20 |
| Concentrations | | | |
| Carbon Monoxide (CO), ppmv | 175 | 160 | 250 |
| Oxygen ($O_2$), % | 18.9 | 18.7 | 18.0 |
| Carbon Dioxide ($CO_2$), % | 1.5 | 1.6 | 2.1 |
| Oxides of Nitrogen ($NO_x$), ppmv | 107.0 | 142.0 | 170.0 |
| Oxides of Sulfur ($SO_x$), ppmv | 0.0 | 2.0 | 3.0 |
| Emission Rate lbs/hr as $SO_2$ | | | |
| Soot Particulates | 0 | 0 | 0 |

TABLE 4

| Without Unit | | | |
|---|---|---|---|
| Test Summary | Low Speed (625 RPM) | Average Speed (1000 RPM) | High Speed (1500 RPM) |
| Elapsed Time (minutes) | 10 | 10 | 10 |
| Concentrations | | | |
| Carbon Monoxide (CO), ppmv | 175 | 145 | 170 |
| Oxygen ($O_2$), % | 19.1 | 19.0 | 18.7 |
| Carbon Dioxide ($CO_2$), % | 19.1 | 1.5 | 1.7 |
| Oxides of Nitrogen ($NO_x$), ppmv | 100.0 | 126.0 | 141.0 |
| Oxides of Sulfur ($SO_x$), ppmv | 1.0 | 2.0 | 3.0 |
| Emission Rate lbs/hr as $SO_2$ | | | |
| Soot Particulates | 100 | 100 | 100 |

It was observed that there was significant leakage of air into the test apparatus at the medium and high engine speeds without the scrubber apparatus 10 being used. It is believed that the excess flow of air into the test apparatus prevented accurate determinations of emission concentrations because filters of the test apparatus became plugged. In fact, this phenomenon skewed the results such that higher concentrations would have been measured in the results for operation without the scrubber apparatus 10 had there been no leakage.

From the results of the further testing, and even without allowance for the skewing resulting from the leakage, the scrubber 10 of the present invention reduced the $NO_x$ emission rates by 0.055−0.030=0.025 (45.5%), 0.076−0.003=0.073 (96.1%), and 0.274−0.093=0.181 (66.8%). The concentrations of $SO_x$ were reduced by 40.0−0.0=40.0 100%, 28.0−1.0=27.0 96.8%, and 3.0−3.0=0 (0.0%) at the low, medium and high speeds, the emission rates being correspondingly reduced by 0.128−0.000=0.128 (100%), 0.170−0.002=0.168 (98.8%), and 0.023−0.006=0.017 (74%).

The present invention is advantageously inexpensive to produce in that none of the filter means requires the use of precious metals such as platinum. Also, the treatment apparatus 10 is particularly easy to service by replacement and/or recharging of the cartridge 32 and/or the tray member 84, the materials of the various filter means being particularly inexpensive and readily available.

Although the present invention has been described in considerable detail with reference to certain preferred versions thereof, other versions are possible. For example, the tray hinge 86 can be separable for convenient removal and replacement of the tray member 84. Therefore, the spirit and scope of the appended claims should not necessarily be limited to the description of the preferred versions contained herein.

What is claimed is:

1. Apparatus for scrubbing combustion gas, the gas being produced by combustion in a Diesel cycle, comprising:
   (a) means for directing the gas downwardly through a first scrubber passage, the first scrubber passage having means for holding a first filter material therein for contacting the gas, and first nozzle means for feeding a scrubbing liquid, the liquid contacting the gas and at least a portion of the first filter material;
   (b) means for directing the gas upwardly through a second scrubber passage, and cartridge means for holding at least one second filter material within the second scrubber passage for contacting the gas, the second filter material comprising borax; and
   (c) a reservoir chamber connecting bottom extremities of the scrubber passages, the reservoir chamber being capable of sealingly retaining a supply of the scrubbing liquid to a sufficient level that gas flowing into the second scrubber passage from the first scrubber passage is required to pass through the scrubbing liquid.

2. The apparatus of claim 1, wherein the second filter material comprises limestone in combination with borax.

3. The apparatus of claim 2, wherein the cartridge means includes means for holding a first supply of the limestone at least partially submerged in the scrubbing liquid, and means for holding a supply of the borax above the first supply of the limestone.

4. The apparatus of claim 2, wherein the cartridge means further includes means for holding a second supply of the limestone above the supply of borax.

5. The apparatus of claim 2, wherein the cartridge means further includes means for holding a supply of particulate charcoal above the supply of borax.

6. The apparatus of claim 2, wherein the cartridge means further includes means for holding a supply of activated particulate charcoal above the supply of borax, the charcoal having been activated by oxidation of heavy metal components thereof.

7. Apparatus for scrubbing combustion gas, the gas being produced by combustion of gasoline, comprising:
   (a) means for directing the gas downwardly through a first scrubber passage, the first scrubber passage having means for holding a first filter material therein for contacting the gas, and first nozzle means for feeding a scrubbing liquid, the liquid contacting the gas and at least a portion of the first filter material;
   (b) means for directing the gas upwardly through a second scrubber passage, and cartridge means for holding at least one second filter material within the second scrubber passage for contacting the gas, at least one of the first filter material and the second filter material comprising crystalline ammonia; and
   (c) a reservoir chamber connecting bottom extremities of the scrubber passages, the reservoir chamber being capable of sealingly retaining a supply of the scrubbing liquid to a sufficient level that gas flowing into the second scrubber passage from the first scrubber passage is required to pass through the scrubbing liquid.

8. The apparatus of claim 7, wherein the second filter material comprises limestone in combination with the ammonia.

9. Apparatus for scrubbing combustion gas, comprising:
   (a) means for directing the gas downwardly through a first scrubber passage, the first scrubber passage having means for holding a first filter material therein for contacting the gas, and first nozzle means for feeding a scrubbing liquid, the liquid contacting the gas and at least a portion of the first filter material;
   (b) means for directing the gas upwardly through a second scrubber passage, and cartridge means for holding at least one second filter material within the second scrubber passage for contacting the gas;
   (c) a reservoir chamber connecting bottom extremities of the scrubber passages, the reservoir chamber being capable of sealingly retaining a supply of the scrubbing liquid to a sufficient level that gas flowing into the second scrubber passage from the first scrubber passage is required to pass through the scrubbing liquid; and
   (d) second nozzle means for feeding the scrubbing liquid, the liquid contacting the gas and at least a portion of the second filter material.

10. The apparatus of claim 9, further comprising means for holding at least one third filter material in the second scrubber passage, the gas being required to flow through the third filter material.

11. The apparatus of claim 10, wherein the third filter material comprises activated charcoal.

12. The apparatus of claim 10, further comprising baffle means between the second nozzle means and the third filter material for preventing upward flow of the liquid.

13. The apparatus of claim 9, comprising pump means for feeding the scrubbing liquid from the reservoir chamber to the first and second nozzle means.

14. Apparatus for scrubbing combustion gas, comprising:
   (a) means for directing the gas downwardly through a first scrubber passage, the first scrubber passage having means for holding a first filter material therein for contacting the gas, and first nozzle means for feeding a scrubbing liquid, the liquid contacting the gas and at least a portion of the first filter material;
   (b) means for directing the gas upwardly through a second scrubber passage, and cartridge means for holding at least one second filter material within the second scrubber passage for contacting the gas;
   (c) a reservoir chamber connecting bottom extremities of the scrubber passages, the reservoir chamber being capable of sealingly retaining a supply of the scrubbing liquid to a sufficient level that gas flowing into the second scrubber passage from the first scrubber passage is required to pass through the scrubbing liquid;
   (d) means for directing the gas upwardly through an inlet passage, an outlet of the inlet passage being fluid-connected to an inlet of the first scrubber passage; and
   (e) ignition means for producing secondary combustion of the gas in the inlet passage.

15. The apparatus of claim 14, further comprising baffle means in the inlet passage for promoting the secondary combustion.

16. The apparatus of claim 14, wherein the gas is produced by combustion of gasoline, the apparatus further comprising a ceramic member, the ceramic member being heated sufficiently by the gas for promoting the secondary combustion.

17. Apparatus for scrubbing combustion gas, the gas being produced by combustion of Diesel fuel, comprising:
   (a) means for directing the gas downwardly through a first scrubber passage, the first scrubber passage having means for holding a first filter material therein for contacting the gas, and first nozzle means for feeding a scrubbing liquid, the liquid contacting the gas and at least a portion of the first filter material, the first filter material comprising copper ore;
   (b) means for directing the gas upwardly through a second scrubber passage, and cartridge means for holding at least one second filter material within the second scrubber passage for contacting the gas; and
   (c) a reservoir chamber connecting bottom extremities of the scrubber passages, the reservoir chamber being capable of sealingly retaining a supply of the scrubbing liquid to a sufficient level that gas flowing into the second scrubber passage from the first scrubber passage is required to pass through the scrubbing liquid.

18. Apparatus for scrubbing combustion gas, comprising:
   (a) means for directing the gas downwardly through a first scrubber passage, the first scrubber passage having means for holding a first filter material within the first scrubber passage, and first nozzle means for feeding a scrubbing liquid, the liquid contacting the gas and below at least a portion of the first filter material;
   (b) means for directing the gas upwardly through a second scrubber passage, and cartridge means for holding at least one second filter material within the second scrubber passage for contacting the gas, the cartridge means comprising:
      (i) means for holding a first supply of limestone at least partially submerged in the scrubbing liquid;
      (ii) and means for holding a supply of borax above the first supply of the limestone; and
      (iii) means for holding a second supply of the limestone above the supply of borax;
   (c) a reservoir chamber connecting bottom extremities of the scrubber passages, the reservoir chamber being capable of sealingly retaining a supply of the scrubbing liquid to a sufficient level that gas flowing into the second scrubber passage from the first scrubber passage is required to pass through the scrubbing liquid;
   (d) means for holding at least one third filter material in the second scrubber passage and above the second nozzle means, the gas being required to flow through the third filter material, the third filter means comprising charcoal;
   (e) pump means for feeding the scrubbing liquid from the reservoir chamber to the first nozzle means; and
   (f) ignition means for producing secondary combustion of the gas in the inlet passage.

* * * * *